June 22, 1937. G. B. MANGAN Re. 20,420

HIGH VOLTAGE FUSE

Original Filed May 27, 1929

WITNESSES:
Leon J. Vaza.
Ralph H. Swingle

INVENTOR
George B. Mangan.
BY F. W. Lyle.
ATTORNEY

Reissued June 22, 1937 Re. 20,420

UNITED STATES PATENT OFFICE 20,420

HIGH VOLTAGE FUSE

George B. Mangan, Washington, D. C., assignor to Westinghouse Electric & Manufacturing Company, a corporation of Pennsylvania Original No. 1,955,138, dated April 17, 1934, Serial No. 366,275, May 27, 1929. Application for reissue September 10, 1935, Serial No. 40,001

21 Claims. (Cl. 200—127)

My invention relates to electrical fuses and particularly to fuses of the high-voltage expulsion type.

One object of my invention is to provide a fuse of the above-mentioned class that shall be open or adapted to be opened at both of its ends for the escape of heated metal and gases, which are produced when the fuse is ruptured.

As flame and hot molten particles were thrown to considerable distances by fuses of this type, as heretofore employed, they were limited, in their application, to outdoor service and then only to applications in which damage would not result to adjoining apparatus or to workmen in the vicinity thereof.

In practicing my invention, I provide an expulsion fuse that may open at one or at both of its ends, each end being closed by an end cover and having a receptacle adjacent thereto to catch the end cover and products of fusion and to partially cool and deionize the expelled gases.

A shielding structure is provided about the receptacle to direct the gases away from the terminals and the supporting structure and adjacent apparatus. This shield has a deionizing screen across its open end to further deionize the hot gases ejected from the fuse mechanism. By so reducing the conductivity of the arc gases, flashovers are prevented between the terminals and ground and between adjoining apparatus, and the arc will not restrike after having once been extinguished.

It is, therefore, another object of my invention to provide an enclosure over each end of the expulsion tube that shall receive the products of fusion and shall cool and deionize the gases associated therewith.

It is a further object of my invention to provide a shield, preferably of metal, although other materials may be employed, for directing the gases away from the supporting terminals, in a fuse of the above-mentioned type, and comprising a barrier for directing the gases away from the terminals and the supporting structure and for aiding in cooling and deionizing them.

It is a still further object of my invention to provide a hinged cap over one end of my device when, under certain conditions, the lower opening only is employed, that shall act as a safety device to permit the gases to escape and to close the opening thereafter.

Figure 1:
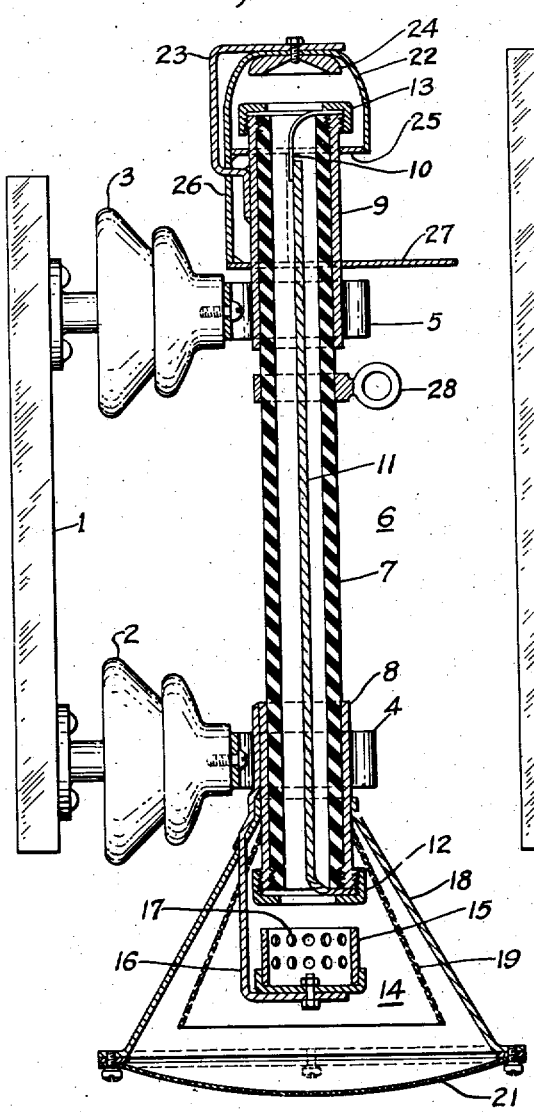
Figure 2:
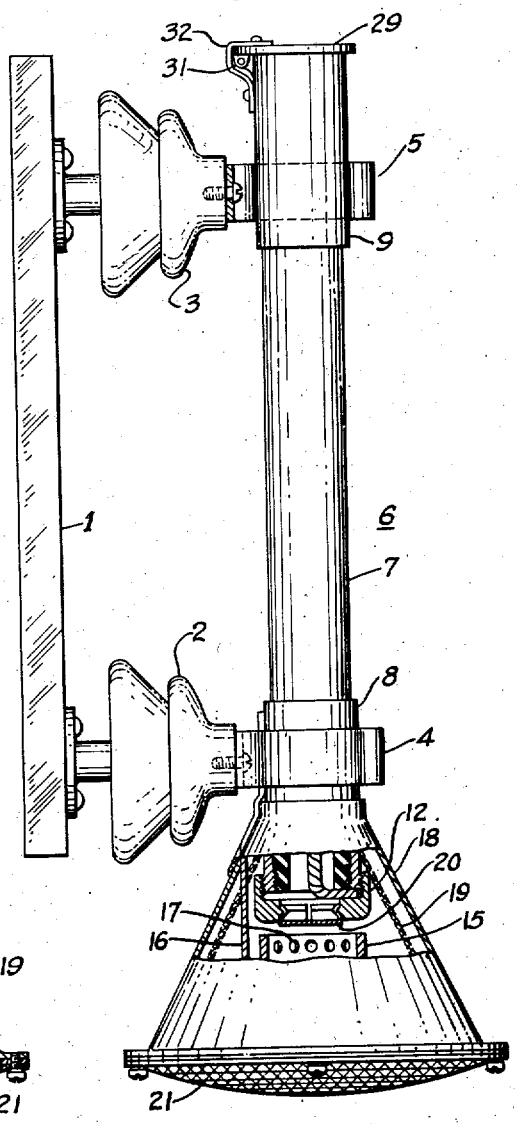

With these principles and objects in mind, my invention will best be understood by referring to the following description and the drawing, wherein Figure 1 is an elevational view, partly in section, showing a fuse structure embodying my invention;

Fig. 2 is a view, in elevation, of a device similar to that shown in Fig. 1, the upper catching device being omitted.

My invention comprises, in general, a base 1, upon which the insulating supporting members 2 and 3 are mounted, having clips 4 and 5 on their outer ends to support the fuse mechanism and to connect it in an electrical circuit that is associated with the said clips.

The fuse mechanism 6 comprises an insulating tube 7 having open or releasably sealed terminals 8 and 9 mounted on its ends in such manner as to be engaged by the clips 4 and 5 of the supporting members 2 and 3. The releasable seals for terminals 8 and 9 may comprise a cap 20, shown in Fig. 2.

A fusible element 10 and a flexible conductor 11 are positioned within the tube 7 and are clamped by means of the ferrules 12 and 13, in electrical engagement with the terminals 8 and 9.

A receptacle 14 includes a cup-shaped member 15 mounted on a support 16 adjacent, but preferably in spaced relation to the lower end of the fuse tube 7. Perforations 17 in the side walls of the cup 15 are employed to cool and deionize the conducting gases ejected into the cup 15 as they pass out therethrough. The fused remains of the element 10 and the conductor 11 that are ejected along with the gases, are caught by the cup 15 and are retained thereby.

A shield 18 on the terminal 8 extends over the receptacle 14 and is employed to direct the gases downwardly away from the clip 4. A metal screen 19 is provided between the catching device 14 and the shield 18 to cool and deionize the gases that pass outwardly through the former. A metal screen 21 closes the lower end of the shield 18 and is employed to finally cool and deionize the gases that pass through it.

A structure similar to that described and here shown on the lower portion of the fuse tube may be employed on the upper opening. Such a construction readily adapts itself to horizontal or angular mounting, as well as to the vertical mounting shown in the drawing. I have shown, however, an enclosing structure of a somewhat different type that may be substituted for the one just described when it is desired to reduce the space above the fuse structure to a minimum, or to protect the interior portions thereof from the elements.

An inverted metal cup 22 encloses the upper end of the tube 7 and is supported by a member 23 on the terminal 9. A target 24 is mounted directly opposite the opening in the end of the tube against which any ejected material may be blown. A screen 25 closes the lower portion of the cut to catch the ejected particles and to cool and deionize the gases passing therethrough.

In order to prevent the gases from being blown downwardly between the supporting clips 4 and 5, a metal shield 26 is provided around the terminal 9 which extends upwardly into engagement with the edge of the cup 22. Such structure has the additional advantage of preventing the conducting gases from being blown rearwardly over the supporting member 3 to possibly cause a flash-over to the grounded base 1. A metal barrier 27 is provided about the tube 7 in engagement with the shield 26 to prevent the downward passage of the gases and to cool and deionize that portion of the gases coming into contact therewith or with the shield 26 to thereby prevent a flash-over between the terminals 8 and 9.

The enclosing members, in both instances, are mounted upon the terminals 8 and 9 so that the entire structure will be supported in operating condition through engagement with the supporting clips 4 and 5. The tube 7 may be provided with an eye-ring 28 to be engaged by a hook-stick (not shown) to constitute a means of removal of the fuse structure from the supporting clips 4 and 5 in order that it may be examined and the fusible element 10 renewed.

In some applications, where head room is not restricted, it may be desirable to cheapen the structure by omitting the upper deionizing and receiving device. For such service, I have provided a hinged cap 29, as shown in Fig. 2, that is supported by a hinge 31 to enclose the upper end of the terminal 9. A spring 32 is associated with the hinge 31 to normally hold the cap 29 in closed position. The amount of pressure exerted by the spring 32 to close the cap 29 is such that the cap may operate as a safety device to be opened by the pressure developed within the tube 7 after it reaches a predetermined degree.

Heretofore, fuses have been provided, in certain instances, with safety caps that were blown from the end of the tube when the pressure reached a predetermined degree. Such structures proved to be unsatisfactory because of the accumulation of rain and moisture within the tube after the cap had been blown free. In practicing my invention, I overcome this objection by providing a cap that is retained over the opening of the fuse tube after having been blown open to permit the escape of the gases.

The deionization that I accomplish through deionizing means such as screens 19, 21 and 25 and perforations 17 and the surfaces of the plates 26 and 27, has been described and claimed by Joseph Slepian in his Patent No. 1,819,207, granted August 18, 1931, and assigned to the Westinghouse Electric & Manufacturing Company, the assignee of the present application.

It will thus be seen that I have provided an enclosing structure for a double-end expulsion-type mechanism that is provided with a receptacle to catch the fused particles of metal and, at the same time, to cool and deionize the flame and gases accompanying the fusion. My invention is further novel in providing shields over the receptacle and deionizing means for directing the gases away from the supporting terminals. A still further novelty of my invention is the provision of an enclosing cap for one end of a double-end fuse that may be opened by the increased pressure developed within the mechanism but has a biasing means for returning it to its closed position.

While I have described and illustrated a single embodiment of my invention, it is to be understood that it is merely by way of illustrating the broad principle of my invention and that many changes, additions and substitutions may be made therein without departing from the spirit and scope thereof. Therefore, I desire that the appended claims shall be limited only to the degree made necessary by the prior art.

I claim as my invention:

1. An expulsion-type fuse including a tube having a fusible element therein, terminals on both ends of the tube in contact with the fuse element to form electrical connection therewith and a perforated metal cup adjacent to an end of the tube and in spaced relation to the adjacent end of the tube and to the terminal thereon.

2. An expulsion-type fuse including a tube having a fusible element therein, supports for both ends of the tube, terminals on both ends of the tube in contact with the fuse element and with the supports to form electrical connection therewith and a perforated metal cup adjacent to each end of the tube and in spaced relation to the adjacent end of the tube and to the terminal thereon.

3. An expulsion-type fuse including a tube having a fuse element therein, supports for both ends of the tube, terminals on both ends of the tube in contact with the fuse element and with the supports to form electrical connection therewith, a perforated metal cup adjacent to each end of the tube in spaced relation thereto and a shield enclosing the cup and having means for deionizing the arc gases.

4. An expulsion-type fuse including a tube having a fuse element therein, supports for both ends of the tube, terminals on both ends of the tube in contact with the fuse element and with the supports to form electrical connection therewith, a cup adjacent to each end of the tube in spaced relation thereto, a shield enclosing one cup having means for deionizing the arc gases and a metal barrier between the ends of the tube and adjacent the other cup for directing the escaping gases away from the region between the terminals and to ensure rapid cooling and deionization thereof.

5. An expulsion-type fuse including a tube having a fuse element within it, supports for both ends of the tube, terminals on both ends of the tube in contact with the fuse element and with the supports to form electrical connection therewith, a cup adjacent to one end of the tube in spaced relation thereto, a shield enclosing the cup and a metal screen closing the shield.

6. An expulsion-type fuse including a tube having a fuse element within it, supports for both ends of the tube, terminals on both ends of the tube in contact with the fuse element and with the supports to form electrical connection therewith, a cup adjacent to one end of the tube, a directing shield enclosing the cup on all sides except the outer portion for the escape of the gases and flame evolved upon fuse rupture, and a metal screen for closing the said outer portion of the shield.

7. A fuse having open-end terminals and a fuse element connected in circuit therewith, a stopping device adjacent to the lower terminal, in spaced relation thereto and having deionizing perforations therein, a shield enclosing the stopping device, deionizing means for closing the said shield and a safety cap for enclosing the upper terminal.

8. An expulsion fuse open at its lower end and having a fuse element associated therewith, a catching device adjacent to the opening and in the path of the metal and gases expelled when the fuse is ruptured, a shield enclosing the catching device and open at its lower end, and a flame-removing structure associated with the last said opening.

9. An expulsion fuse open at one end, a fusible element, a catching device adjacent the opening and in the path of the metal and gases expelled upon fuse rupture, said device having deionizing openings in its sides.

10. An expulsion fuse open at one end, a fusible element, a catching device adjacent to the opening and in the path of the metal and gases expelled upon fuse rupture, and a shield enclosing the catching device and open at one of its sides.

11. The combination with an electrical fuse having terminals at its ends, a supporting structure for the fuse, and a metal barrier between the ends of the tube to direct the gases away from the region between the terminals and to cool and deionize the gases in contact therewith.

12. An expulsion-type fuse including a tube having a fusible element therein, supports for both ends of the tube, terminals on both ends of the tube in contact with the fuse element and with the supports to form electrical connection therewith, a releasable cover for one end of the tube and a metal cup adjacent to an end of the tube in spaced relation with the said cover for receiving said end cover upon fuse rupture.

13. An expulsion-type fuse including a tube having a fusible element therein, supports for both ends of the tube, terminals on both ends of the tube in contact with the fuse element and with the supports to form electrical connection therewith, a releasable cover for each end of the tube and a metal cup adjacent to each end in spaced relation with the covers.

14. An expulsion-type fuse including a tube having a fuse element therein, a cup-shaped member disposed adjacent one end of the tube for catching metal particles upon fuse rupture, said cup being spaced from the end of the tube to permit the escape of gases therebetween, a metal shield or deflector for deflecting said escaping gases from the opposite end of the tube, and a screen through which said escaping gases must pass for cooling and deionizing the same.

15. An expulsion-type fuse including a tube having a fuse element therein, a cup adjacent one end of the tube for catching metal particles upon fuse rupture, said cup being spaced from the end of the tube to permit the escape of expelled gases therebetween, and a shield enclosing the cup and directing said expelled gases away from the opposite end of the tube.

16. An expulsion-type fuse including a tube having a fuse element therein, a cup adjacent one end of the tube for catching metal particles upon fuse rupture, said cup being spaced from the end of the tube to permit the escape of expelled gases therebetween, a shield enclosing the cup and directing said expelled gases away from the opposite end of the tube, and a screen closing the outer end of said shield for cooling and deionizing said expelled gases.

17. An expulsion-type fuse including a tube having a fuse element therein, a cup adjacent one end of the tube for catching metal particles upon fuse rupture, said cup being spaced from the end of the tube to permit the escape of expelled gases therebetween, a shield enclosing the cup and directing said expelled gases away from the opposite end of the tube, and a screen intermediate the cup and the shield for cooling and deionizing said expelled gases.

18. A high voltage expulsion air fuse comprising a tube having terminals at its ends and open at one end, a fuse element in said tube, means for catching metal particles and for deflecting the gases expelled upon fuse rupture, said means comprising a cup-shaped member disposed adjacent said open end in spaced relation thereto and in the path of the metal and expelled gases, and deflecting means adjacent said open end for deflecting said expelled gases away from the region between the terminals to prevent arcing between said terminals.

19. A high voltage expulsion air fuse, comprising a tube open at one end, a fuse element in said tube, and means for catching and retaining metal fuse particles and for laterally deflecting the gases expelled upon fuse rupture, said means comprising a cup-shaped member disposed adjacent said open end in spaced relation thereto and in the path of the metal particles and expelled gases.

20. In a fuse, an insulating tube, contact means mounted on said tube adjacent each end thereof, a fuse element in said tube connected between said contact means on the tube, one end of the tube having a seat with a cover member releasably secured thereto, said cover member normally closing the end of the tube and being movable away from its seat when pressure is built up in the tube due to rupture of the fuse link to permit an expulsion action out the end of the tube, a chamber mounted on the end of the tube having the removable cover, and means in said chamber for stopping the movement of said cover after it has moved away from its seat a certain distance.

21. In a fuse, an insulating tube, contact means mounted on said tube adjacent each end thereof, a fuse element in said tube connected between said contact means on the tube, one end of the tube having a seat with a cover member releasably secured thereto, said cover member normally closing the end of the tube and being movable away from its seat when pressure is built up in the tube due to rupture of the fuse link to permit an expulsion action out the end of the tube, a chamber mounted on the end of the tube having the removable cover, means in said chamber for stopping the movement of said cover after it has moved away from its seat a certain distance, and means in said chamber providing a large area of surface for cooling and deionizing the gases expelled from the tube.

GEORGE B. MANGAN.